US012577867B2

(12) United States Patent
Cao et al.

(10) Patent No.: US 12,577,867 B2
(45) Date of Patent: Mar. 17, 2026

(54) TREATMENT OF SUBTERRANEAN FORMATIONS

(71) Applicant: Saudi Arabian Oil Company, Dhahran (SA)

(72) Inventors: Dongqing Cao, Beijing (CN); Tianping Huang, Beijing (CN); Ayman Mohammed Almohsin, Doha (SA); Bader G. AlHarbi, Dammam (SA); Xingang Bu, Beijing (CN); Shaohua Chen, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/461,578

(22) Filed: Sep. 6, 2023

(65) Prior Publication Data

US 2025/0075606 A1 Mar. 6, 2025

(51) Int. Cl.
*E21B 43/38* (2006.01)
*C09K 8/52* (2006.01)

(52) U.S. Cl.
CPC ................ *E21B 43/38* (2013.01); *C09K 8/52* (2013.01)

(58) Field of Classification Search
CPC .......... E21B 33/00; E21B 33/12; E21B 43/38; C09K 8/42; C09K 8/426; C09K 8/52
See application file for complete search history.

(56) References Cited

U.S. PATENT DOCUMENTS

| | | | | | |
|---|---|---|---|---|---|
| 3,323,589 | A | * | 6/1967 | Harvey | C09K 8/516 166/292 |
| 5,065,820 | A | * | 11/1991 | Bloys | E21B 33/138 166/291 |
| 5,465,792 | A | * | 11/1995 | Dawson | C09K 8/512 166/295 |
| 11,268,009 | B2 | * | 3/2022 | Bai | C04B 16/06 |
| 2002/0010100 | A1 | * | 1/2002 | Wood | C09K 8/502 507/100 |
| 2014/0060843 | A1 | * | 3/2014 | Murphy | C09K 8/516 507/104 |
| 2015/0267103 | A1 | * | 9/2015 | Medvedev | E21B 33/13 507/221 |
| 2018/0230360 | A1 | * | 8/2018 | Walker | C09K 8/514 |

FOREIGN PATENT DOCUMENTS

| | | | |
|---|---|---|---|
| RU | 2209955 C2 | * | 8/2003 |
| WO | WO-2016029030 A1 | * | 2/2016 ............... C09K 8/03 |

OTHER PUBLICATIONS

Translation of RU-2209955-C2 (Year: 2003).*
Alhuraishawy et al., "Conformance Control Improvement by Coupling Microgel and Low Salinity Waterflooding in Fractured Reservoirs," Prepared for presentation at the SPE Middle East Oil and Gas Show and Conference held in Manama, Bahrain, Mar. 18-21, 2019, 17 pages.

(Continued)

*Primary Examiner* — Angela M DiTrani Leff
(74) *Attorney, Agent, or Firm* — Fish & Richardson P.C.

(57) ABSTRACT

Methods for treating a water zone of a subterranean formation by injecting a slurry including a water-swellable particle, a fiber, and a viscous oil to reduce water production from the formation.

23 Claims, 4 Drawing Sheets

(56) References Cited

OTHER PUBLICATIONS

Bai et al., "Development of Swelling-Rate Controllable Particle Gels to Control the Conformance of $CO_2$ Flooding," Prepared for presentation at the SPE Improved Oil Recovery Conference, Aug. 30, 2020, 15 pages.

Han et al., "General Strategy for Making $CO_2$-Switchable Polymers," ACS Macro Letters, Nov. 14, 2011, 1:57-61, 5 pages.

Spildo et al., "A New Polymer Application for North Sea Reservoirs," Prepared for presentation at the 2008 SPE/DOE Improved Oil Recovery Symposium held in Tulsa, Oklahoma, Apr. 19-23, 2008, 9 pages.

* cited by examiner

TREATMENT OF SUBTERRANEAN FORMATIONS

TECHNICAL FIELD

The present disclosure relates to methods for treating a water zone of a subterranean formation by injecting a slurry including a water-swellable particle, a fiber, and a viscous oil to reduce water production from the formation.

BACKGROUND

A wellbore may be drilled into a subterranean formation for the exploration or production of crude oil and natural gas. An example of a problematic section of a wellbore is a water zone in which water enters the wellbore from the subterranean formation or underlying water aquifer. The influx of water into the wellbore during drilling and during the subsequent production of oil and gas can cause operational difficulties including surface and subsurface corrosion of tubing and pipes, fines migration, and accelerated well abandonment. The production of water along with the oil and gas from the subterranean formation can necessitate surface processing and injection of the produced water back into the formation, for disposal or pressure maintenance. Such processing and injection of water from the water zone causes increased costs of the oil and gas production.

Therefore, there is a need for methods to reduce water production from subterranean formations.

SUMMARY

Provided in the present disclosure is a method of treating a water zone of a subterranean formation. The method includes injecting, through a wellbore into the subterranean formation, a slurry including a water-swellable particle, a fiber, and a viscous oil, and contacting the slurry with the water zone to swell the particles. Swelling the particles reduces an influx of water from the water zone into the wellbore.

Also provided in the present disclosure is a slurry including about 10 wt % to about 30 wt % of a water-swellable particle, about 0.5 wt % to about 5 wt % of a fiber, and about 65 wt % to about 90 wt % of a viscous oil.

DETAILED DESCRIPTION

Figure 1:
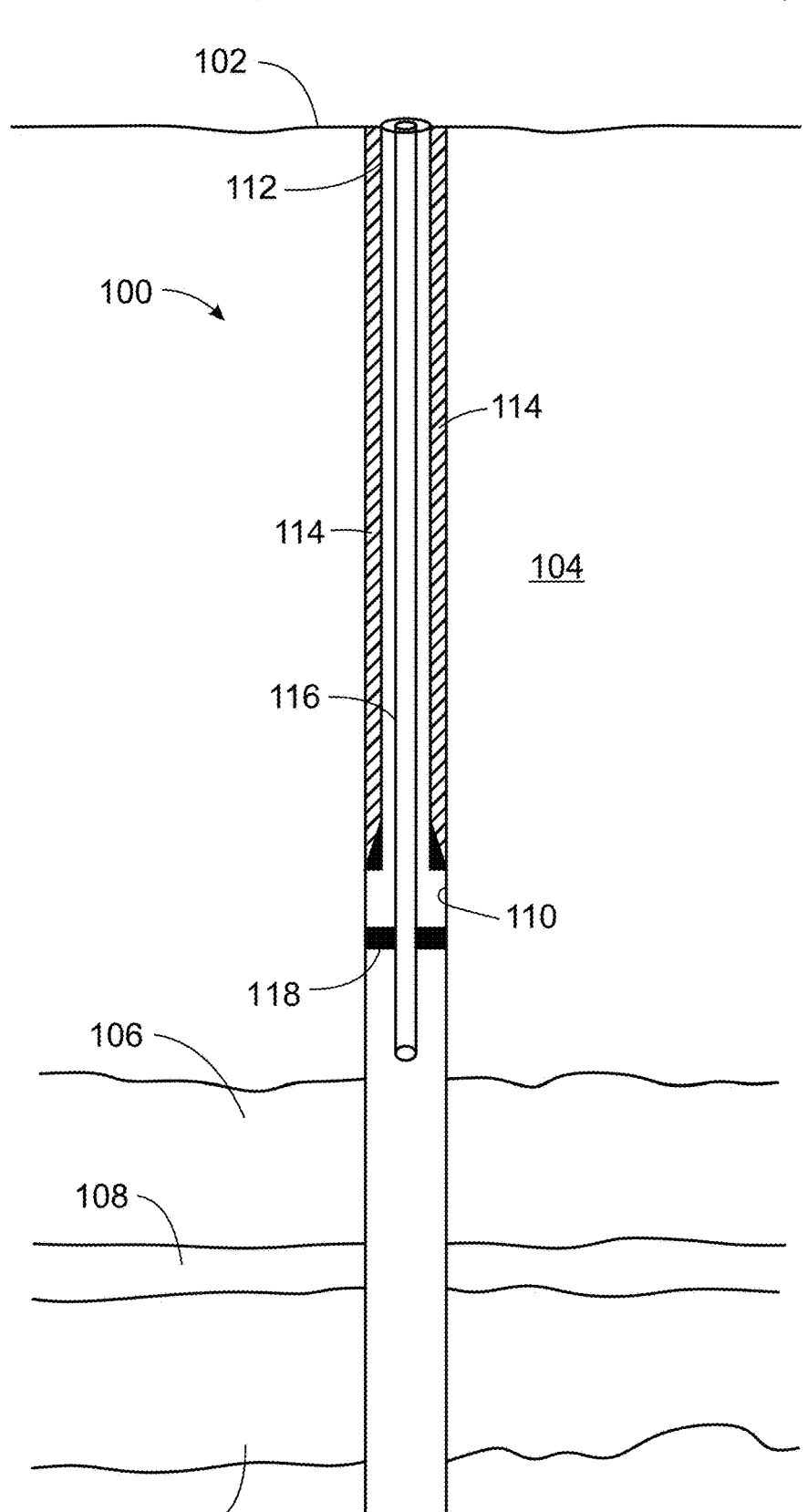
FIG. 1 is a schematic illustration of a wellbore formed through the earth surface into a subterranean formation.

The present disclosure relates to methods for treating a water zone of a subterranean formation by injecting a slurry including water-swellable particles, fibers, and a viscous oil through a wellbore into the subterranean formation. The slurry can flow throughout the formation and into fractures to contact a water zone. Upon contact with water from the water zone, the water-swellable particles can swell, immobilizing the particles and fibers and at least partially blocking influx of water from the water zone into the wellbore, reducing or eliminating operational difficulties associated with high water production from a subterranean formation. Because the slurry is miscible with oil and remains flowable and unswollen until contacting water, the methods of the present disclosure can treat water zones deep within subterranean formations, and can be performed without first isolating the water zone.

Slurry

Provided in the present disclosure are slurries including a water-swellable particle, a fiber, and a viscous oil. In some embodiments, the slurry includes about 0.1 wt % to about 50 wt % of the water-swellable particle and about 0.01 wt % to about 10 wt % of the fiber in the viscous oil. For example, in some embodiments, the slurry includes about 10 wt % to about 30 wt % of the water-swellable particle, about 0.5 wt % to about 5 wt % of the fiber, and about 65 wt % to about 90 wt % of the viscous oil. In some embodiments, the slurry includes at least about 80 wt %, for example, at least about 85 wt %, at least about 90 wt %, at least about 95 wt %, at least about 97.5 wt %, at least about 98 wt %, or at least about 99 wt % of a total amount of the water-swellable particle, the fiber, and the viscous oil. In some embodiments, the slurry includes less than about 5 wt %, for example, less than about 2.5 wt %, less than about 1 wt %, less than about 0.5 wt %, or less than about 0.1 wt % of water. In some embodiments, the slurry is substantially free from water.

The water-swellable particle can absorb an aqueous fluid, such as water, increasing its volume. In some embodiments, the water-swellable particle has an absorption capacity of about 2 to about 100 times its mass before swelling, for example, about 2 to about 50 times, about 2 to about 20 times, about 4 to about 100 times, about 4 to about 50 times, or about 4 to about 20 times its mass before swelling. In some embodiments, the water-swellable particle has a volume after swelling of about 2 to about 20 times its volume before swelling, for example, about 2 to about 15 times, about 2 to about 10 times, about 5 to about 20 times, about 5 to about 15 times, or about 5 to about 10 times its volume before swelling. In some embodiments, the water-swellable particle reaches its absorption capacity after about 1 second to about 48 hours, for example, after about 5 seconds to about 24 hours, about 10 seconds to about 12 hours, or about 30 seconds to about 6 hours.

In some embodiments, an average size of the water-swellable particle before swelling is about 1 μm to about 100 mm, for example, about 1 μm to about 50 mm, about 1 μm to about 10 mm, about 10 μm to about 100 mm, about 10 μm to about 50 mm, about 10 μm to about 10 mm, about 100 μm to about 100 mm, about 100 μm to about 50 mm, or about 100 μm to about 10 mm.

In some embodiments, the water-swellable particle includes a synthetic polymer, a superabsorber, a natural polymer, or any combination thereof. In some embodiments, the water-swellable particle includes a crosslinked polymer. In some embodiments, the water-swellable particle includes a synthetic polymer, for example, a polyacrylamide, a polyacrylate, or both. In some embodiments, the water-swellable particle includes a natural polymer, for example, a polysaccharide such as a starch or xanthan gum. In some embodiments, the water-swellable particle includes a superabsorber.

Exemplary superabsorbers include acrylamide-based polymers, acrylate-based polymers, and hydrogel. In some embodiments, the water-swellable particle includes a preformed particle gel.

In some embodiments, the slurry includes about 0.1 wt % to about 50 wt % of the water-swellable particle, for example, about 0.1 wt % to about 40 wt %, about 0.1 wt % to about 30 wt %, about 5 wt % to about 50 wt %, about 5 wt % to about 40 wt %, about 5 wt % to about 30 wt %, about 10 wt % to about 50 wt %, about 10 wt % to about 40 wt %, or about 10 wt % to about 30 wt % of the water-swellable particle. In some embodiments, the slurry includes about 10 wt %, about 15 wt %, about 20 wt %, about 25 wt %, or about 30 wt % of the water-swellable particle.

The fiber can be a flexible material capable of freely flowing with the water-swellable particle before swelling, and capable of reinforcing the immobilized water-swellable particle after swelling. In some embodiments, an average diameter of the fiber is about 0.1 μm to about 100 μm, for example, 0.1 μm to about 50 μm, about 0.1 μm to about 20 μm, about 1 μm to about 100 μm, about 1 μm to about 50 μm, about 1 μm to about 20 μm, about 5 μm to about 100 μm, about 5 μm to about 50 μm, or about 5 μm to about 20 μm. In some embodiments, an average length of the fiber is about 100 μm to about 1 m, for example, about 100 μm to about 500 mm, about 100 μm to about 100 mm, about 1 mm to about 1 m, about 1 mm to about 500 mm, about 1 mm to about 100 mm, about 10 mm to about 1 m, about 10 mm to about 500 mm, or about 10 mm to about 100 mm.

In some embodiments, the fiber includes a carbon fiber, a glass fiber, a ceramic fiber, a natural fiber, a plastic fiber, a thermoplastic fiber, a metal fiber, a mineral fiber, or any combination thereof. In some embodiments, the fiber includes a plastic fiber, for example, including polypropylene, polyethylene, polyethylene terephthalate, polyvinyl alcohol, polyester, polylactic acid, or any combination thereof. In some embodiments, the fiber includes a polyester fiber, a polylactic acid fiber, a glass fiber, or any combination thereof.

In some embodiments, the slurry includes about 0.01 wt % to about 10 wt % of the fiber, for example, about 0.01 wt % to about 7.5 wt %, about 0.01 wt % to about 5 wt %, about 0.1 wt % to about 10 wt %, about 0.1 wt % to about 7.5 wt %, about 0.1 wt % to about 5 wt %, about 0.5 wt % to about 10 wt %, about 0.5 wt % to about 7.5 wt %, or about 0.5 wt % to about 5 wt % of the fiber. In some embodiments, the slurry includes about 0.5 wt %, about 1 wt %, about 1.5 wt %, about 2 wt %, about 2.5 wt %, about 3 wt %, about 3.5 wt %, about 4 wt %, about 4.5 wt %, or about 5 wt % of the fiber.

In some embodiments, the viscous oil has a viscosity of about 10 cP to about 2,000 cP at about 21° C., for example, about 10 cP to about 1,000 cP, about 10 cP to about 100 cP, about 25 cP to about 2,000 cP, about 25 cP to about 1,000 cP, or about 25 cP to about 100 cP at about 21° C. In some embodiments, the viscous oil includes a silicone oil, a crude oil, a mineral oil, diesel oil, or any combination thereof. For example, in some embodiments, the viscous oil includes a silicone oil.

In some embodiments, the slurry includes about 40 wt % to about 99 wt % of the viscous oil, for example, about 40 wt % to about 95 wt %, about 40 wt % to about 90 wt %, about 50 wt % to about 99 wt %, about 50 wt % to about 95 wt %, about 50 wt % to about 90 wt %, about 65 wt % to about 99 wt %, about 65 wt % to about 95 wt %, or about 65 wt % to about 90 wt % of the viscous oil. In some embodiments, the slurry includes about 65 wt %, about 70 wt %, about 75 wt %, about 80 wt %, about 85 wt %, or about 90 wt % of the viscous oil.

Treatment Methods

Also provided in the present disclosure is a method of treating a water zone of a subterranean formation. The method includes injecting a slurry including a water swellable particle, a fiber, and a viscous oil into a subterranean formation, and contacting the slurry with the water zone to swell the particles. Swelling the particles can reduce an influx of water from the water zone into the wellbore. The slurry can be any slurry of the present disclosure.

FIG. 1 is a schematic illustration of a wellbore 100 formed through the earth surface 102 into a subterranean formation 104. The subterranean formation includes hydrocarbon reservoir formations 106 and an intervening water zone 108. Water may enter the wellbore 100 from the water zone 108. An inner surface of the wellbore 100 is the formation surface 110 of the subterranean formation 104. In the illustrated embodiment, a portion of the wellbore 100 has a casing 112 with cement 114 disposed between the casing 112 and the formation surface 110. The wellbore 100 has a production tubing 116 (through a production packer 118) for the flow of produced fluid including hydrocarbon to the surface 102. The hydrocarbon can be crude oil or natural gas that enters the wellbore 100 from the hydrocarbon reservoir formations 102. The produced fluid flowing upward through the production tubing 116 also includes water that enters the wellbore 100 from the water zone 108. The water from water zone 108 can cause production problems by generating emulsions, scale, and corrosion. The water from water zone 108 can also incur operational cost, because the water must typically be separated from the hydrocarbons.

Figure 2:
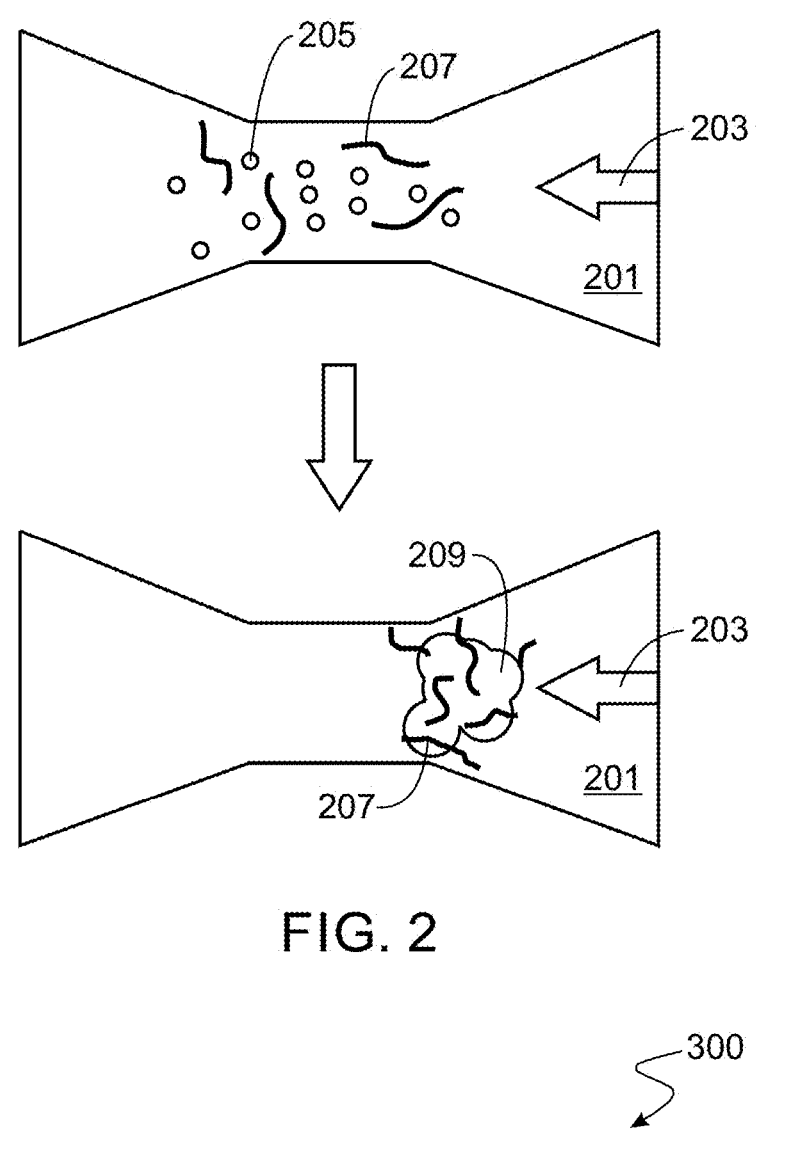
FIG. 2 is a schematic illustration of a slurry contacting a water zone.

In some embodiments, injecting the slurry includes pumping the slurry through the wellbore into the water zone. In some embodiments, the water zone includes a fracture. In some embodiments, the water zone includes a high-permeability streak. In the illustrated embodiment, the slurry can be pumped through tubing 116, into the subterranean formation 104. Upon contacting water zone 108, the water-particles can swell, reducing an influx of water from the water zone 108 into the wellbore 100. For example, FIG. 2 is a schematic illustration of a slurry including water-swellable particles 205 and fibers 207 contacting a fracture 201 producing water 203. After contacting the water 203, swollen particles 209 reinforced by fibers 207 block the flow of water 203 out of the fracture 201.

In some embodiments, the slurry includes at least about 80 wt %, for example, at least about 85 wt %, at least about 90 wt %, at least about 95 wt %, at least about 97.5 wt %, at least about 98 wt %, or at least about 99 wt % of a total amount of the water-swellable particle, the fiber, and the viscous oil. In some embodiments, the slurry includes less than about 5 wt %, for example, less than about 2.5 wt %, less than about 1 wt %, less than about 0.5 wt %, or less than about 0.1 wt % of water. In some embodiments, the slurry is substantially free from water.

In some embodiments, the method includes injecting about 0.01 pore volumes (PV) to about 0.5 PV of the slurry into the subterranean formation, for example, about 0.01 PV to about 0.4 PV, or about 0.01 PV to about 0.3 PV.

Figure 3:
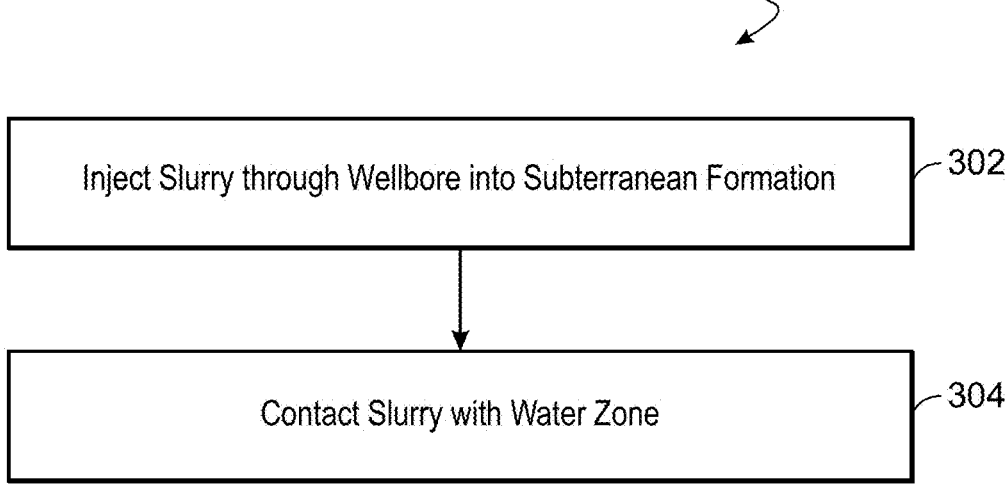
FIG. 3 is a block flow diagram of a method for treating a water zone of a subterranean formation.

FIG. 3 is a process flow diagram of a method 300 for treating a water zone of a subterranean formation. The method starts at block 302 with the injection of a slurry including a water-swellable particle, a fiber, and a viscous oil. At block 304 of the method, the slurry is contacted with water zone to swell the particles.

Definitions

The terms "a," "an," and "the" are used in the present disclosure to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used in the present disclosure, the term "about" can allow for a degree of variability in a value or range, for example, within 10%, within 5%, or within 1% of a stated value or of a stated limit of a range.

In the methods of the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in the present disclosure, the term "superabsorber" refers to a swellable, crosslinked polymer that, by forming a gel, is capable of absorbing and storing many times its own weight of water-based liquids. Superabsorbers retain the water-based liquid that they absorb and typically do not release the absorbed liquids, even under pressurized conditions. Superabsorbers also increase in volume upon absorption of the water-based liquid they absorb.

As used in the present disclosure, the term "preformed particle gel" refers to a particled superabsorbent crosslinking polymer. Preformed particle gels include, for example, preformed bulk gels, partially preformed gels, and microgels.

As used in the present disclosure, the term "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Injecting a material in a subterranean formation can include contacting the material with any section of a wellbore or with any subterranean region in fluid contact therewith. Subterranean materials can include any materials placed into the wellbore such as cement, drill shafts, liners, tubing, casing, or screens; injecting a material in a subterranean formation can include contacting with such subterranean materials. In some examples, a subterranean formation or material can be any below-ground region that can produce liquid or gaseous petroleum materials, water, or any section below-ground in fluid contact therewith.

As used in the present disclosure, the term "water zone" refers to a water-producing region of a subterranean formation. Water zones of a subterranean formation include fractures or high-permeability zones that allow water to enter a wellbore from the subterranean formation. Water zones can be identified, for example, based on a water content of the total produced fluids from a well bore. In some embodiments, a water content of total produced fluids from a wellbore of 90% or more indicates the presence of a water zone. Water zones including fractures can also be identified, for example, using specialized testing tools such as logging tools or subsurface pressure testing methods.

EXAMPLES

Example 1. Slurry in Water and Crude Oil

Figure 4:
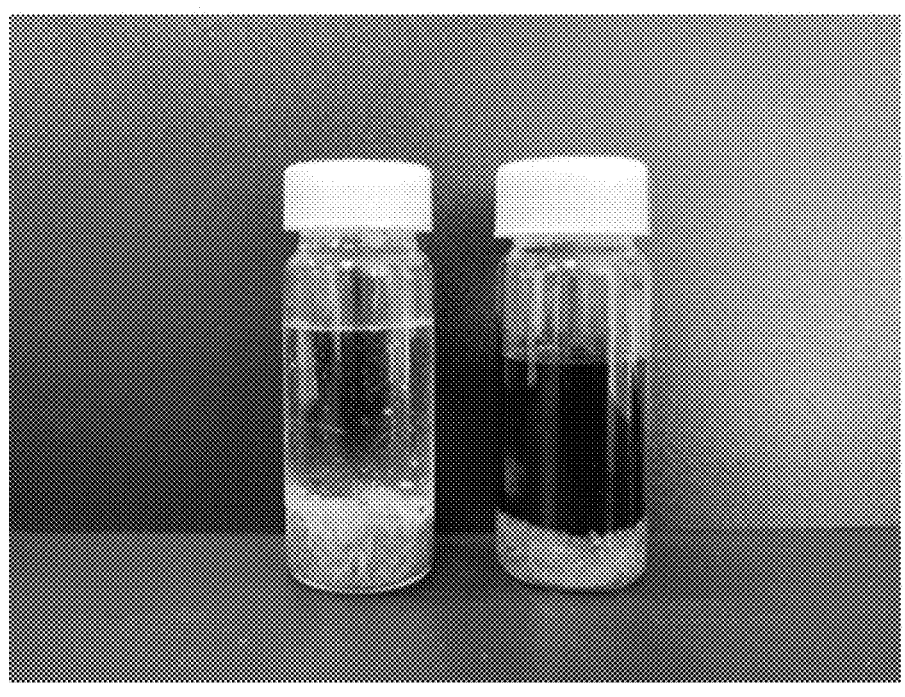
FIG. 4 is a photograph showing a slurry according to an embodiment of the present disclosure, immediately after adding to water (left) or crude oil (right).
Figure 5:
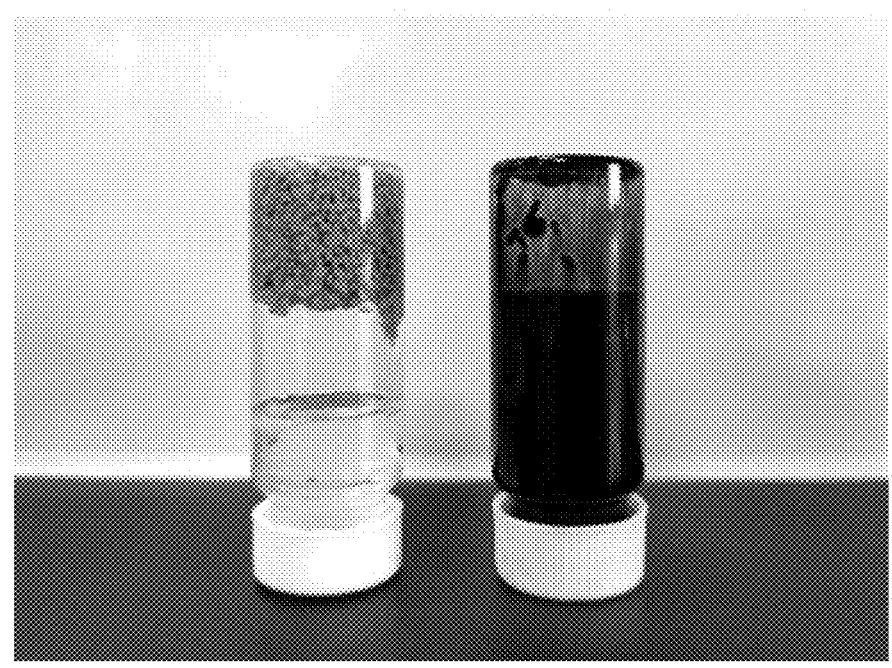
FIG. 5 is a photograph showing a slurry according to an embodiment of the present disclosure, 24 hours after adding to water (left) or crude oil (right).

A slurry of 20 wt % preformed particle gel (0.5 mm particle size) and 1 wt % polyethylene terephthalate fibers (6 mm length) in silicone oil (50 cP) was prepared. Samples of the same weight of the slurry were placed in each of two glass bottles, which were then filled with water and crude oil, respectively. Photographs of the samples immediately after preparation, and 24 hours after preparation, are shown in FIGS. 4 and 5, respectively. As shown in FIG. 5, the particles swelled in water (left bottle) and formed a pack with the fibers at the bottom of the bottle that stayed in place even after inverting the bottle. In the crude oil (right bottle), the particles and fibers remained completely dispersed. The results indicate that the slurry could migrate through crude oil before packing to block a flow of water.

Example 2. Blocking Test in Slurry-Containing Fracture

Blocking tests were performed on the slurry of Example 1 by the core flooding method, which evaluates the pressure build-up when water or oil flow through a packed fracture. An artificial fracture metal plug (stainless steel, diameter 3.8 cm, length 7.0 cm) was used to eliminate the effect of the matrix permeability. The fracture size was 7.0 cm (length) by 2.5 cm (width) by 0.2 cm (height).

6.0 g of slurry was placed on one half of the artificial fracture. After reassembling the two halves with end plugs and O-rings, the plug was loaded into a core holder, and the confining pressure was set to 1,000 psi. Water or oil was injected into the core at a flow rate of 0.5 mL/min, and the differential pressure was recorded.

Figure 6:
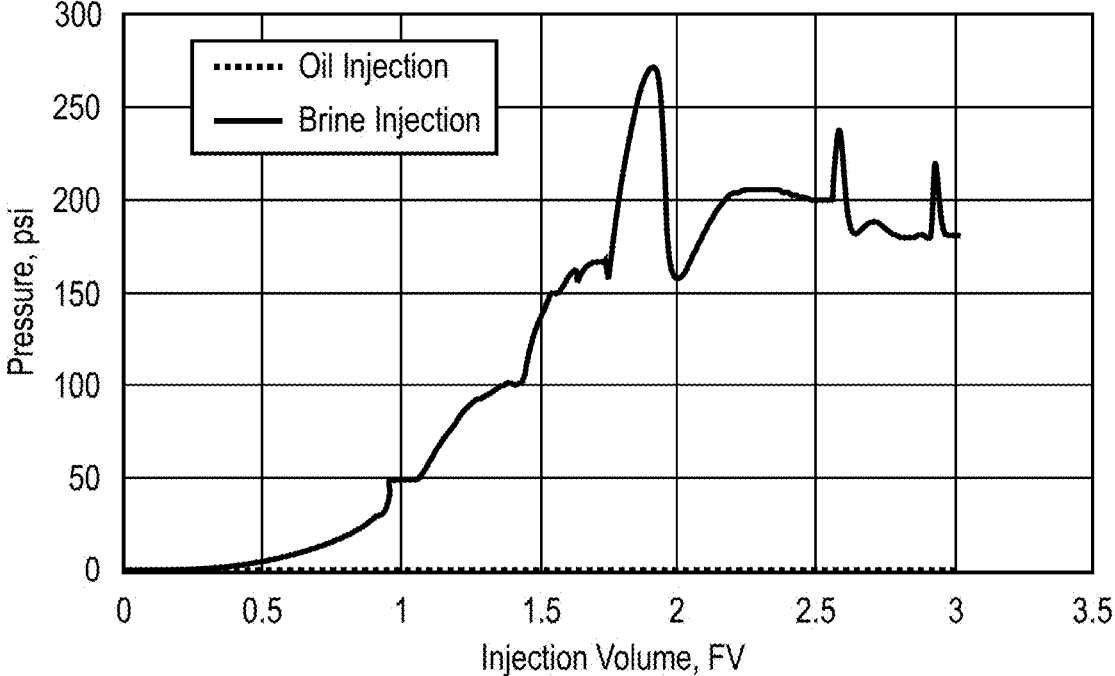
FIG. 6 is a plot showing pressures of an artificial plug containing a slurry according to an embodiment of the present disclosure following injection of water or oil.

FIG. 6 shows the recorded pressures during water or oil injection. When water was injected, the pressure initially slowly increased. As the oil in the system was displaced by water, the particles started to swell. After about 0.5 fracture volumes (FV) were injected, the pressure quickly increased and then stabilized around 200 psi. This indicated that the particles had fully swelled, and were effectively blocking water. When oil was injected, the pressure increase was negligible. This indicated that the slurry did not block oil flow.

EMBODIMENTS

Certain embodiments of the present disclosure are provided in the following list:

Embodiment 1. A method of treating a water zone of a subterranean formation, the method comprising injecting, through a wellbore into the subterranean formation, a slurry comprising a water-swellable particle, a fiber, and a viscous oil; and contacting the slurry with the water zone to swell the particles, wherein swelling the particles reduces an influx of water from the water zone into the wellbore.

Embodiment 2. The method of embodiment 1, wherein the slurry comprises about 0.1 wt % to about 50 wt % of the water-swellable particle.

Embodiment 3. The method of embodiment 1 or embodiment 2, wherein an average size of the water-swellable particle before swelling is about 1 μm to about 100 mm.

Embodiment 4. The method of embodiment 1 or embodiment 2, wherein an average size of the water-swellable particle before swelling is about 100 μm to about 10 mm.

Embodiment 5. The method of any one of embodiments 1-4, wherein the water-swellable particle comprises a synthetic polymer, a superabsorber, a natural polymer, or any combination thereof.

Embodiment 6. The method of any one of embodiments 1-5, wherein the water-swellable particle comprises a crosslinked polymer.

Embodiment 7. The method of any one of embodiments 1-6, wherein the water-swellable particle comprises a preformed particle gel.

Embodiment 8. The method of any one of embodiments 1-7, wherein the slurry comprises about 0.01 wt % to about 10 wt % of the fiber.

Embodiment 9. The method of any one of embodiments 1-8, wherein an average diameter of the fiber is about 0.1 μm to about 100 μm.

Embodiment 10. The method of any one of embodiments 1-8, wherein an average diameter of the fiber is about 1 μm to about 20 μm.

Embodiment 11. The method of any one of embodiments 1-10, wherein an average length of the fiber is about 100 μm to about 1 m.

Embodiment 12. The method of any one of embodiments 1-10, wherein an average length of the fiber is about 1 mm to about 100 mm.

Embodiment 13. The method of any one of embodiments 1-12, wherein the fiber comprises a carbon fiber, a glass fiber, a ceramic fiber, a natural fiber, a plastic fiber, a thermoplastic fiber, a metal fiber, a mineral fiber, or any combination thereof.

Embodiment 14. The method of embodiment 13, wherein the fiber comprises a glass fiber.

Embodiment 15. The method of embodiment 13, wherein the fiber comprises a plastic fiber.

Embodiment 16. The method of embodiment 15, wherein the plastic fiber comprises a polyester fiber, a polylactic acid fiber, or both.

Embodiment 17. The method of any one of embodiments 1-16, wherein the slurry comprises about 40 wt % to about 99 wt % of the viscous oil.

Embodiment 18. The method of any one of embodiments 1-17, wherein a viscosity of the viscous oil is about 10 cP to about 2,000 cP at about 21° C.

Embodiment 19. The method of any one of embodiments 1-17, wherein a viscosity of the viscous oil is about 10 cP to about 100 cP at about 21° C.

Embodiment 20. The method of any one of embodiments 1-19, wherein the viscous oil comprises a silicone oil, a crude oil, a mineral oil, a diesel oil, or any combination thereof.

Embodiment 21. The method of any one of embodiments 1-19, wherein the viscous oil comprises a silicone oil, a mineral oil, or any combination thereof.

Embodiment 22. The method of any one of embodiments 1-21, wherein the slurry before injecting comprises at least about 90 wt % of a total amount of the water-swellable particle, the fiber, and the viscous oil.

Embodiment 23. The method of any one of embodiments 1-22, wherein the slurry before injecting comprises less than about 5 wt % of water.

Embodiment 24. The method of any one of embodiments 1-23, comprising injecting about 0.01 pore volumes (PV) to about 0.5 PV of the slurry into the subterranean formation.

Embodiment 25. The method of any one of embodiments 1-23, comprising injecting about 0.01 PV to about 0.3 PV of the slurry into the subterranean formation.

Embodiment 26. The method of any one of embodiments 1-25, wherein the water zone comprises a fracture or high-permeability streak.

Embodiment 27. A slurry, comprising about 10 wt % to about 30 wt % of a water-swellable particle;

about 0.5 wt % to about 5 wt % of a fiber; and about 65 wt % to about 90 wt % of a viscous oil.

Embodiment 28. The slurry of embodiment 27, wherein an average size of the water-swellable particle before swelling is about 100 μm to about 10 mm; and the water-swellable particle comprises a preformed particle gel.

Embodiment 29. The slurry of embodiment 27 or embodiment 28, wherein an average length of the fiber is about 1 mm to about 100 mm; and the fiber comprises a plastic fiber.

Embodiment 30. The slurry of any one of embodiments 27-29, wherein a viscosity of the viscous oil is about 10 cP to about 100 cP at about 21° C.; and the viscous oil comprises a silicone oil.

Other implementations are also within the scope of the following claims.

What is claimed is:

1. A method of treating a water zone of a subterranean formation, the method comprising:

injecting about 0.01 pore volumes (PV) to about 0.5 PV of a non-aqueous slurry, through a wellbore into the subterranean formation, the slurry comprising:

about 10 wt % to about 50 wt % of a water-swellable particle comprising a superabsorbent preformed particle gel, wherein the superabsorbent preformed particle gel comprises a crosslinking polymer, about 0.01 wt % to about 10 wt % of a fiber, and an oil having a viscosity of about 10 cP to about 2,000 cP at about 21° C.; and contacting the slurry with the water zone to swell the particles, wherein swelling the particles reduces an influx of water from the water zone into the wellbore.

2. The method of claim 1, wherein the slurry comprises about 10 wt % to about 30 wt % of the water-swellable particle.

3. The method of claim 1, wherein an average size of the water-swellable particle before swelling is about 1 μm to about 100 mm.

4. The method of claim 1, wherein an average size of the water-swellable particle before swelling is about 100 μm to about 10 mm.

5. The method of claim 1, wherein the water-swellable particle comprises a superabsorber comprising an acrylamide-based polymer, an acrylate-based polymer, a hydrogel, or any combination thereof.

6. The method of claim 1, wherein the slurry comprises about 0.05 wt % to about 5 wt % of the fiber.

7. The method of claim 1, wherein an average diameter of the fiber is about 0.1 μm to about 100 μm.

8. The method of claim 1, wherein an average diameter of the fiber is about 1 μm to about 20 μm.

9. The method of claim 1, wherein an average length of the fiber is about 100 μm to about 1 m.

10. The method of claim 1, wherein an average length of the fiber is about 1 mm to about 100 mm.

11. The method of claim 1, wherein the fiber comprises a carbon fiber, a glass fiber, a ceramic fiber, a natural fiber, a plastic fiber, a thermoplastic fiber, a metal fiber, a mineral fiber, or any combination thereof.

12. The method of claim 11, wherein the fiber comprises a glass fiber.

13. The method of claim 11, wherein the fiber comprises a plastic fiber.

14. The method of claim 13, wherein the plastic fiber comprises a polyester fiber, a polylactic acid fiber, or both.

15. The method of claim 1, wherein the slurry comprises about 40 wt % to about 99 wt % of the oil.

16. The method of claim 1, wherein a viscosity of the oil is about 10 cP to about 100 cP at about 21° C.

17. The method of claim 1, wherein the oil comprises a silicone oil, a crude oil, a mineral oil, a diesel oil, or any combination thereof.

18. The method of claim 1, wherein the oil comprises a silicone oil, a mineral oil, or any combination thereof.

19. The method of claim 1, wherein the slurry before injecting comprises at least about 90 wt % of a total amount of the water-swellable particle, the fiber, and the oil.

20. The method of claim 1, wherein the slurry before injecting comprises less than about 5 wt % of water.

21. The method of claim 1, comprising injecting about 0.01 PV to about 0.3 PV of the slurry into the subterranean formation.

22. The method of claim 1, wherein the water zone comprises a fracture or high-permeability zone.

23. The method of claim 1, wherein the superabsorbent preformed particle gel comprises a preformed bulk gel, a partially preformed gel, or a microgel.

* * * * *